Sept. 20, 1949.  W. G. SHEARER  2,482,694
DEVICE FOR FILING CIRCULAR SAWS
Filed Jan. 5, 1948  4 Sheets-Sheet 1

INVENTOR.
Walter G. Shearer
BY
ATTORNEYS.

Sept. 20, 1949.  W. G. SHEARER  2,482,694
DEVICE FOR FILING CIRCULAR SAWS
Filed Jan. 5, 1948  4 Sheets-Sheet 3

INVENTOR.
Walter G. Shearer
BY
ATTORNEYS.

Sept. 20, 1949.     W. G. SHEARER     2,482,694
DEVICE FOR FILING CIRCULAR SAWS
Filed Jan. 5, 1948    4 Sheets-Sheet 4
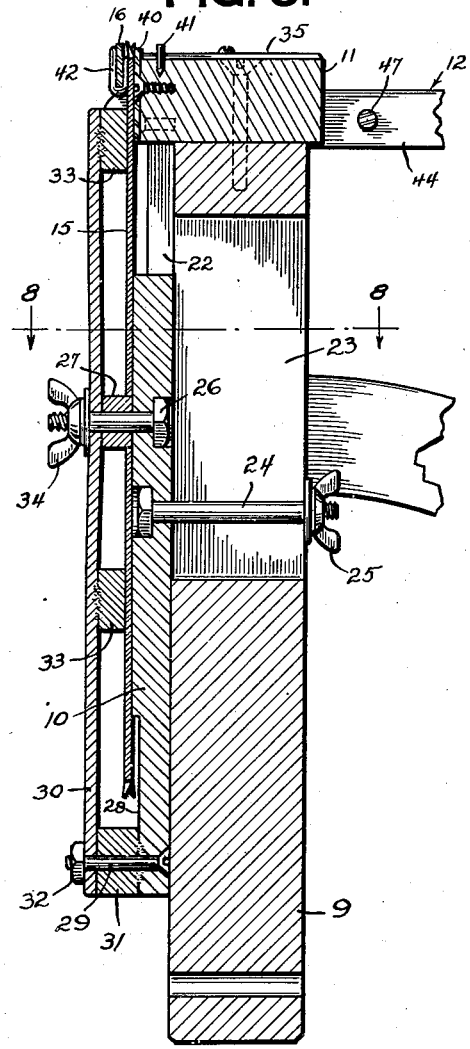
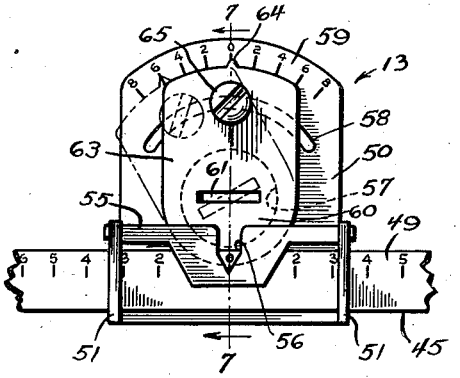
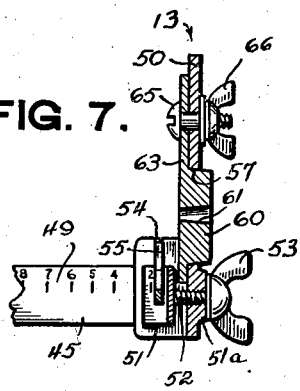
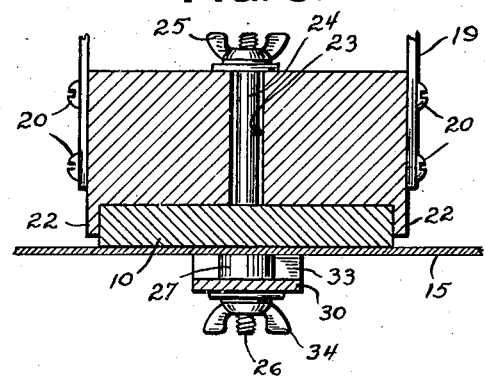
INVENTOR.
Walter G. Shearer.
BY
ATTORNEYS.

Patented Sept. 20, 1949

2,482,694

UNITED STATES PATENT OFFICE 2,482,694

DEVICE FOR FILING CIRCULAR SAWS

Walter G. Shearer, Wenatchee, Wash.

Application January 5, 1948, Serial No. 562

9 Claims. (Cl. 76—31)

This invention relates to a device for filing circular saws and particularly well adapted for jointing and filing raker and cutting teeth with a high degree of precision, as well as saws and dados, having no raker teeth.

More particularly my invention comprises a stand in which a circular saw may be mounted for turning in a vertical plane, adjustable as to height to bring the teeth at the required position for jointing and sharpening and for retaining the saw against lateral movements at the point where the dressing of the teeth is performed.

Another feature of my invention resides in a jointing gauge attachment for maintaining the file at the proper elevation for jointing operations, the attachment being in the form of bar for guiding the dressing file to one elevation for operation on the cutting teeth and reversible for guiding the file to a lower elevation for dressing the raking teeth.

Another feature of my invention resides in the provision of a curved tilting rail for regulating the inclination of the file and a file guide and pitch gauge for regulating the pitch and slope of the teeth so that all the teeth will have a uniform bevel.

Another feature of my invention resides in the provision of a file holder for holding round, flat or triangular files for operation on any type of saw teeth in the filing device, such feature not being claimed in the present application but forming the subject matter of my copending application for File holders, filed January 5, 1948, Serial No. 563.

Further features, objects and advantages of my invention will appear in the following detailed description of a highly satisfactory embodiment thereof, reference being had to the accompanying drawings illustrating the same and forming a part of this specification.

In the drawings:

Fig. 5 is a fragmental vertical sectional view thereof taken substantially along line 5—5 of Fig. 1.

Fig. 6 is a detail front elevation of a file guide element thereof.

Fig. 7 is a vertical sectional view of the guide taken on line 7—7 of Fig. 6.

Fig. 8 is a detail horizontal sectional view of the saw holding elements taken substantially on line 8—8 of Fig. 5.

Figure 1:
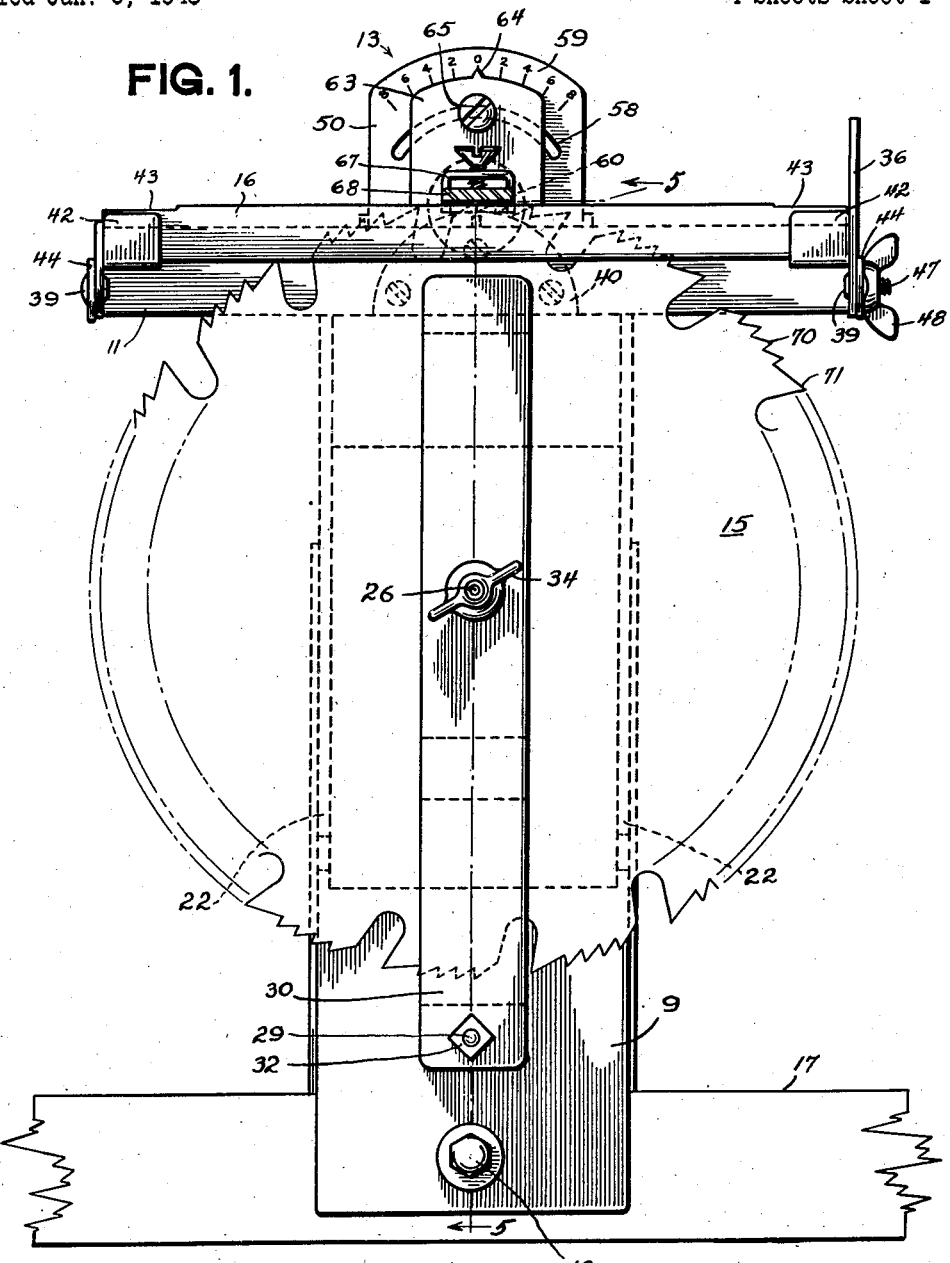
Fig. 1 is a front elevation of a device for filing circular saws in accordance with my invention.

Referring to the drawings, the saw filing device illustrated comprises in general an upright base support 9 carrying a vertically adjustable saw mounting block 10. On the upper end of base 9 is a cross arm 11 carrying a curved tilting rail 12 upon which a bevel gauge 49 with a file guide and pitch gauge 13 is adjustably mounted for guiding a file holder 14 in position for operating on the teeth of a circular saw 15. The cross arm 11 also carries, forward of saw 15, a removable jointing and raker tooth gauge 16 for dressing the saw teeth to the required diametrical length with the raker teeth outer ends in a diameter slightly less than that of the outer ends of the cutting teeth.

Figure 3:
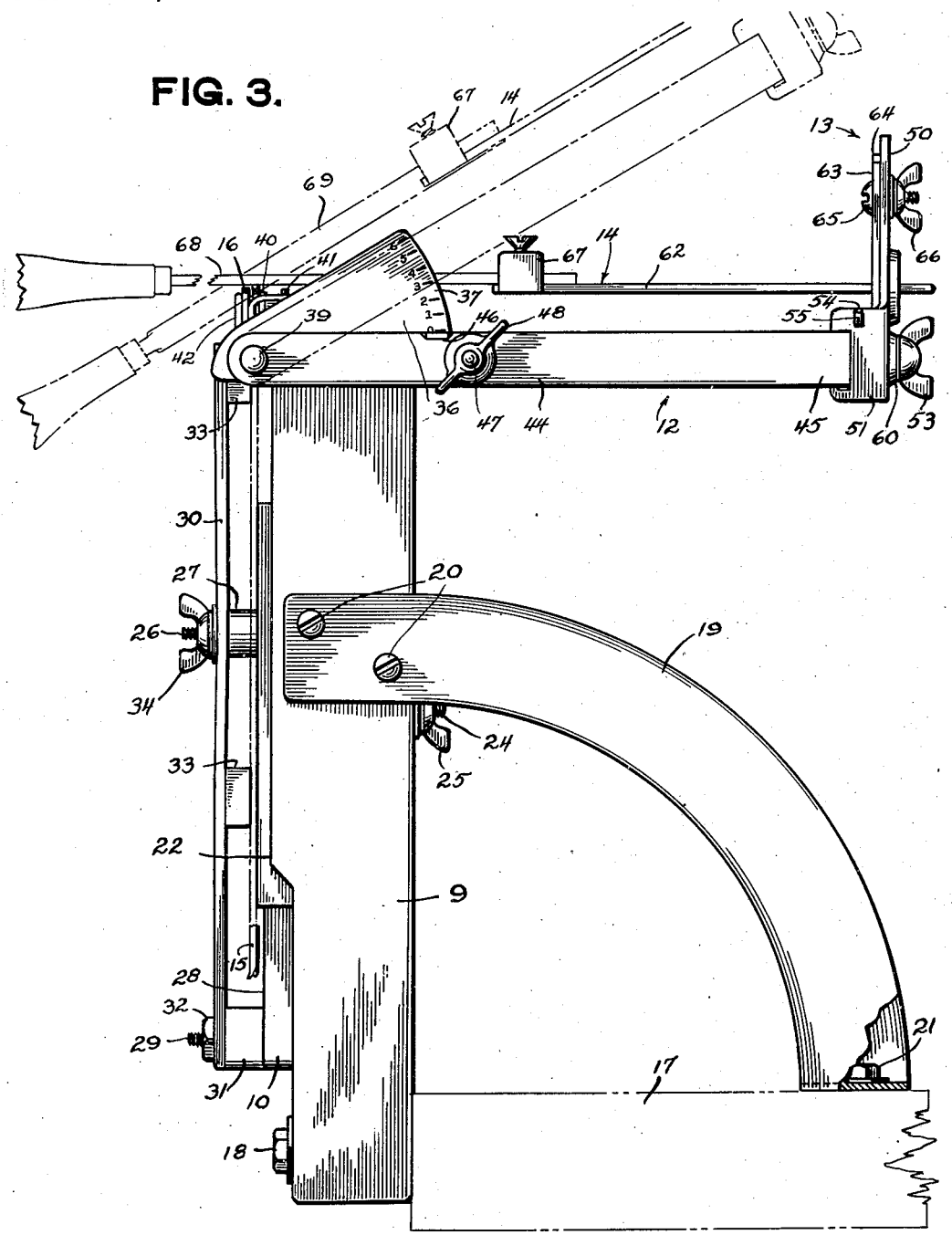
Fig. 3 is a side elevation of the device.
Figure 4:
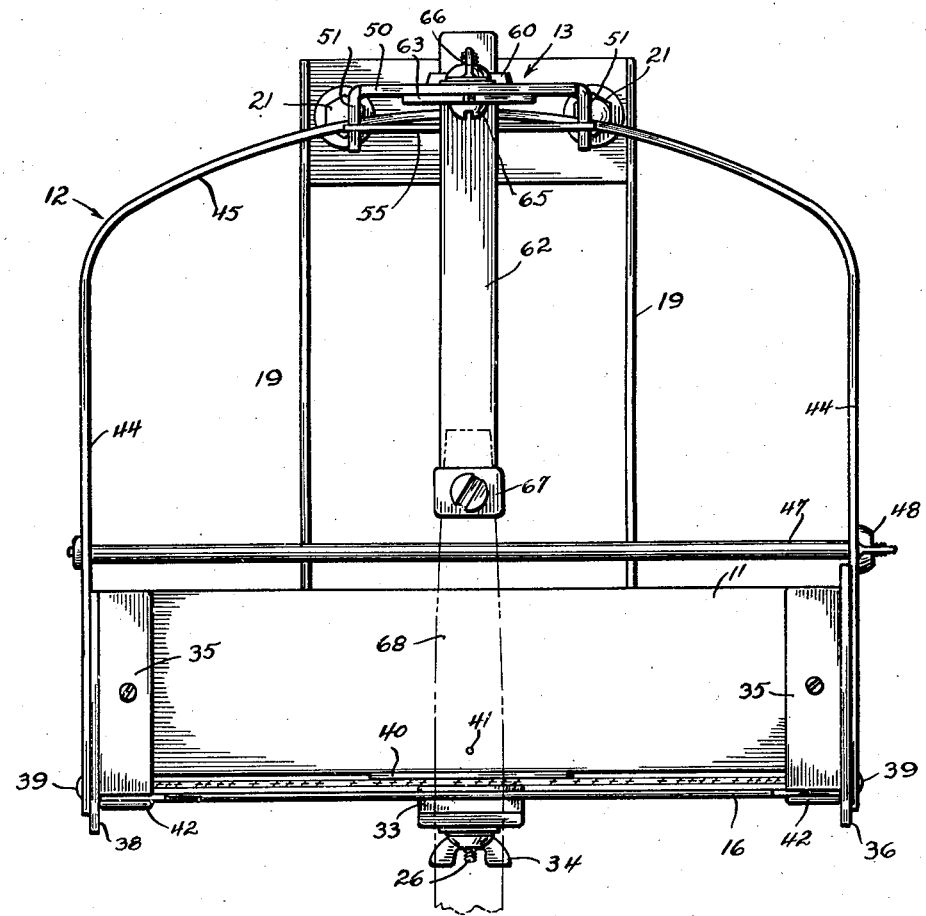
Fig. 4 is a plan view thereof.

Base support 9 comprises a rigid post for mounting in an upright position in a vice, or as shown, secured to a bench 17 by means of a lateral bolt 18 and a member 19 fastened to its sides by a pair of screws 20 at each side of and to the top surface of bench 17 by bolts 21 as best shown in Figs. 3 and 4, so as to maintain it in a rigid upright position. Support 9 has latertal guide elements 22 along its front side edges forming a channel between them which receives and guides saw mounting block 10, and a vertical slot 23 midway between guide elements provides for the mounting bolt 24 for the saw mounting block 10 and up and down adjustments thereof. A wing nut 25 on bolt 24 facilitates manual operation in tightening and loosening of the block for such vertical adjustments.

Saw mounting block 10 has a snug sliding fit in the channel on base support 9 provided by guide elements 22 so as to maintain it in all vertically adjusted positions in proper relation with respect to the saw dressing or filing guide elements carried on cross arm 11 at the top of base support 9. Above the saw block mounting bolt 24, block 10 is provided with a forwardly extending saw mounting bolt 26, upon which is mounted a bushing 27 having an outer diameter of a size corresponding with the diameter of the hole thru the circular saw 15 which is to be mounted thereon. As best shown in Fig. 5 the lower portion of block 10 has a depression 28 so that the teeth of saw 15 having the teeth set will be free from engagement therewith and adjacent the bottom of block 10 is a forward extending bolt 29 upon which a saw clamping bar 30 is pivotally mounted. Bar 30 has a spacing block 31 at its lower end thru which bolt 29 also passes and nut 32 on this bolt prevents the removal of bar 30 but the nut and bolt have a loose fit therewith so as to permit a slight outward swinging of the bar as well as lateral pivoting. Bar 30 has a pair of contact blocks 33 for pressing against the side of saw 15 above and below the central hole therein, the upper block being adjacent to the upper periphery of the saw. When saw 15 is mounted on block 10 as described above strip or bar 30, which is slightly flexible, is swung into position over saw mounting bolt 26 and drawn into engagement with the outer end of bushing 27 by means of a manually operated wing nut 34 flexing bar 30 inwardly and applying pressure on saw 15 thru contact blocks 33. Saw 15 is thus rigidly maintained against lateral movement particularly at its upper periphery as will be referred to hereinafter but may be turned relatively easily so that teeth around its entire circumference may be brought into the upper saw filing position.

While saw mounting block 10 and clamping bar 30 are primarily constructed for the mounting of circular saws of varying sizes and types this mounting block is also adapted to hold various other circular types of cutting tools of a similar nature for filing and sharpening operations such as dado saw elements and the like.

Cross arm 11 is rigidly secured in a horizontal position to the upper end of base support 9 with its outer ends extending an equal distance from the center line of base support 9 and saw mounting block 10 and to the ends of this cross arm are secured bracket elements 35 of angular formation and with horizontal portions engaging the upper face of the cross arm. One, at least of these bracket elements has a vertically extending sector 36 with an inclination scale 37 thereon and the vertical part 38 of the other may merely extend forwardly of the cross arm. These bracket elements extend sufficiently so as to provide pivot mountings 39 in line with the plane of saw 15 upon which the curved tilting rail 12 has its ends pivotally mounted. Along the center line of base support 9 and saw mounting block 10, the front side of cross arm is an abutment plate 40 which extends a short distance above the cross arm and in operation this plate cooperates with the upper contact piece 33 on bar 30 for gripping saw 15 in a rigid position against lateral movement during filing operations on the saw teeth just above it and prevents the saw teeth from coming into contact with the cross arm. Just behind plate 40 along said center line is a stud 41 secured so as to extend from the top of cross arm 11 as an index for guiding the teeth of saw 15 to position for the filing operations to be performed thereon.

Figure 2:
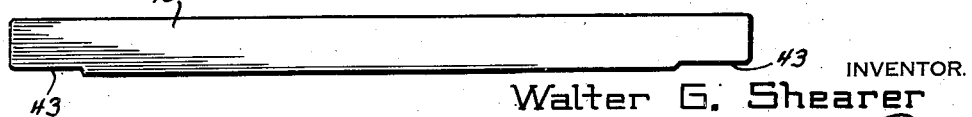
Fig. 2 is a front elevation of the jointing and raker tooth gauge in a reversed position from that illustrated in Fig. 1.

Bracket members 35 have their upper sides extending forwardly and in front of the plane of saw 15 they are bent downwardly and then upwardly upon themselves to provide slotted holders 42 for receiving the ends of the jointing and raker tooth gauge 16 and support it with the upper edge in a horizontal position slightly above the plane of the top of cross arm 11. This jointing and raker tooth gauge is made of very hard metal which will not be cut by the files and become untrue. It has a notch 43 (1/32 inch in depth or the amount corresponding to the difference in depth of raker teeth with respect to cutting teeth of a combination circular saw) in the lower side at each end as shown in Fig. 2. When the gauge is mounted in holders 42 with the notches up as shown in Fig. 1 the gauge is in its high position for filing the tops of cutting teeth of the saw and when mounted in the reverse position with the notches down as shown in Fig. 2 the other edge of the gauge is in its lower position for filing the tops of raker teeth.

As best shown in Figs. 3 and 4, curved tilting rail 12 has forwardly extending arms 44, the forward ends of which are mounted on the pivots 39 on bracket members 35 and the rear ends are connected by the portion 45 curved along radius having its center along the center line of the saw mounting block and in the plane of saw 15. One arm 44 thereof has an index 46 cooperating with scale 37 on sector 36 which scale is calibrated so that when index 46 of the arm is at zero the tilting rail is in a horizontal position and the calibration above zero indicates the inclination of the file when the rail is tilted upwardly or downwardly with respect to sector 36. A draw bolt 47 passes thru both arms 44 just back of sector 36 and by means of wing nut 48 on this bolt the arms 44 may be clamped so as to hold the rail in any adjusted inclined position with respect to sector 36.

The inner side of curved portion 45 of tilting rail 12 is provided with a scale 49 calibrated from zero at the center with graduations to the right and left to determine the bevel setting of the file guide and pitch gauge 13. For the bevel, this gauge is constructed to slide on curved portion 45 of rail 12 and as best illustrated in Figs. 6 and 7. It comprises a vertical plate 50 with forwardly extending ears 51 at its lower end with vertical slots extending therethru, thru which the curved portion 45 of rail 12 extends. The back of plate 50 has a projection 51a thickening it for screw threads to receive a screw 52 with a winged head 53 for turning it into and out of clamping engagement with the tilting rail for holding the gauge in any desired adjusted position on the curved portion 45 thereof. The forward upper portions of ears 51 have notches 54 therein for receiving an index bar 55 which has a depressed slot providing an index opening 56 thru which the reading of scale 49 may be observed for setting the bevel either to the right or the left.

Just above the top of rail 12, plate 50 has a circular opening 57 and above this is an arcuate slot 58. At the top of the slot is a scale 59 with readings to the right and left of a central zero position. Opening 57 provides the bearing for a tapered cylindrical file guide 60 which may be turned therein for regulating the pitch; for guiding the file this guide element has a rectangular tapering slot 61 centrally therethru for receiving a rectangular bar element 62 of the file holder 14 permitting tilting operations thereof. However during filing operations it operates to guide the file in any desired angular position according to the various angle settings for inclination, bevel and for pitch, or slope of the teeth, as will now be described.

File guide 60 is formed integral with a front plate 63 which extends beyond the periphery of the guide and bears against the front face of plate 50 of the bevel gauge, terminating with an upper index pointer 64 for cooperation with scale 59 for indicating the pitch setting of the file guide. A screw 65 extends thru plate 63 and the arcuate slot 58 in plate 50 and has a manually operable wing nut 66 thereon, back of plate 50 for maintaining the guide in its assembled position and clamping it in any desired adjusted position with respect to scale 59.

Thus by means of the tilting rail 12 inclination of the file holder may be adjusted, by the adjustment of sliding plate 50 on the tilting rail, the bevel is determined, and the pitch of the file is regulated by the angular adjustment of the file guide 60 with respect to plate 50 of the bevel gauge.

With this arrangement for determining the angularity of the file for operating on a saw, it is to be noted that files of different types are employed in the filing and dressing operations, such as flat files, triangular files, and even round files as well as others are often employed. The particular function of the file holder 14 is to guide a file by gripping and holding it with the operating file surface extending in a longitudinal direction and in alignment with the rectangular bar 62 of the filed holder so that the other angular adjustments above referred to may be carried out for correct operations on the saw teeth. Since the file holder is covered in a copending application it will be only briefly described as follows.

As shown in Figs. 1, 3 and 4, file holder 14 comprises the rectangular bar 62 with a clamp 67 integral with its inner end for receiving the end of a file such as a flat file 68 or a triangular file 69 as generally indicated in Figs. 4 and 3, respectively, and holding it in such a manner that it will operate on the saw teeth along the vertical center line thereof—substantially over the projecting saw tooth guide element 41 projecting from the top of the cross arm 11.

In operation, a saw 15 is placed in the saw mounting block 10 as illustrated in Fig. 1, the saw illustrated being a combination type having cutting teeth 70 with raker teeth 71 in advance of each group of cutting teeth. The jointing gauge 16 is positioned in the holders 42 with its notches 43 up for operating on the cutting teeth. Saw mounting block 10 is adjusted in base support 9 so that the shortest cutting teeth 70 are flush with the top of the gauge. With the angle gauge of the tilting arms set at zero and a flat file 68 (preferably) carried by the clamp 67 of tool holder 14 the points of all cutting teeth 70 that reach above gauge 16 and contact the file are filed off, turning the saw a tooth at a time into position as indicated by the saw tooth guide element 41. If none of the teeth are filed off the saw should be set a trifle higher and the process is repeated. The filed guide 60 and file holder 14 always maintain the file in the proper position. One hand is all that is necessary to operate the file; the other hand holds and turns the saw.

The raker teeth 71 of combination saws are shorter than the cutting teeth usually about $\frac{3}{32}$ inch. For filing these teeth it is not necessary to change the position of the saw and saw mounting block 10 with respect to base supporting but merely turn the jointing gauge bar 16 over (with notches 43 down as indicated in Fig. 2) and the raker teeth 71 projecting above this guide, at a lower level, are filed off successively turning the saw to bring the teeth into proper operating position as set forth above.

After the jointing operation is completed the jointing gauge 16 is removed. For sharpening the cutting teeth the saw is adjusted so that the depression between the teeth is even with the top of cross arm 11. The tilting gauge is set to the required angle as indicated by scale 37, at the right end of the cross arm. The bevel gauge 59 is set to the required angle (to the right if the teeth slope to the right or the same angle to the left when the saw is turned over and the teeth point to the left). The pitch gauge is set to the required angle by turning the file holder in accordance with the readings of scale. The depressions between the saw teeth are positioned successively to the center line of the file as indicated by the saw tooth guide element 41. A typical example of the settings is 3, 10 and 8 on the respective scales. While these figures are selected at random, it is pointed out that the angles of inclination bevel and pitch vary with different types of saws. The angles may be determined so that the saw filer can be set to correspond for filing the saws as they come from the manufacturer which is advisable in some instances such as odd shaped teeth.

When the saw is turned over and the other side filed the tilt gauge remains the same but the bevel and pitch are set at the same scale readings on the left as they were on the right.

It will be seen that the saw filing device as described provides for uniformity in filing of saw teeth both for jointing and sharpening operations thereon.

I claim:

1. A saw filing device comprising, an upright base support, saw mounting means vertically adjustable on said base support, a horizontal cross arm on the upper end of said support, a jointing bar carried by said cross arms in a position in front of a saw carried by the saw mounting means, a curved tilting rail pivotally carried by the ends of said cross arm, a bevel gauge slidingly mounted on said curved tilting rail, a file guide rotatably mounted in said bevel gauge, means for holding said file guide at the required angle for the proper pitch of a file, a file holder extending through said file guide, and a clamp carried by said file holder for securing a file so as to extend therefrom in a position for operating on teeth of a saw mounted in the saw mounting block.

2. A device for filing circular saws including, an upright base support, said support having lateral guide elements and a vertical slot therethru between the guide elements, a saw mounting block slidable on said base support between said guide elements, a clamping bolt secured to said block and extending thru the vertical slot in said base support for securing the block in a vertically adjusted position on said base support, a circular saw bushing element, a bolt extending from said block on which said bushing is mounted, a flexible bar pivoted at its lower end to said block and having an aperture therethru thru which said bushing carrying bolt is adapted to extend, a nut on said bolt for clamping said bar against the bushing, a saw contact block above and below said bushing for pressing engagement against the outer side of a circular saw mounted on said bushing, a cross arm on the upper end of said base support, and a contact plate on said arm for engagement with the inner side of the circular saw spacing it so that its saw teeth will not engage the cross arm therebeyond and cooperating with the upper saw contact block on said bar for maintaining the upper portion of the saw against lateral movement.

3. A device for filing circular saws including, a base support having means for mounting a circular saw in an upright position with its upper teeth extending above the base support, means for holding the upper portion of the saw against lateral movement, rearwardly extending arms pivotally supported from the upper end of said base support, the axis of the pivot being substantially in the plane of the saw, a curved rail connecting the rear ends of said arms, a bevel gauge slidable on said curved rail, means for securing said gauge in an adjusted position on the rail, a file guide rotatably mounted in bevel gauge means for retaining the file guide in an adjusted angular pitch position in said bevel gauge, a file holder slidably extending thru said file guide, and a draw bolt connected between said rearwardly extending arms for clamping the same with respect to said base support so as to maintain the curved rail at any required inclination.

4. A device for filing circular saws including, a base support having means for mounting a circular saw in an upright position with its upper teeth extending above the base support, means for holding the upper portion of the saw against lateral movement, rearwardly extending arms pivotally supported from the upper end of said base support, the axis of the pivot being substantially in the plane of the saw, and a curved bevel gauge supporting rail connecting the rear ends of said arms the curved rail having as its center a point in the upper edge of a saw mounted on the base support.

5. A device for filing circular saws including, a base support having means for mounting a circular saw in an upright position with its upper teeth extending above the base support, means for holding the upper portion of the saw against lateral movement, rearwardly extending arms pivotally supported from the upper end of said base support, the axis of the pivot being substantially in the plane of the saw, a curved bevel gauge supporting rail connecting the rear ends of said arms the curved rail having as its center a point in the upper edge of a saw mounted on the base support, and a draw bolt connected between said rearwardly extending arms for clamping the same with respect to said base support so as to maintain the curved rail at any required inclination.

6. A device for filing circular saws including, a base support having means for mounting a circular saw in an upright position with its upper teeth extending above the base support, means for holding the upper portion of the saw against lateral movement, brackets having slotted holders carried by said base support at the level of the upper portion of a saw mounted on the base support, a jointing gauge bar supported in said holders in a position so as to be in front of the upper edge of the circular saw, and said bar having notches along one side adjacent the ends thereof so that when the bar is inserted in the holders with the notches down it will be at a lower elevation than when it is inserted in the holders with the notches up.

7. A device for filing circular saws including a base support for supporting and maintaining a circular saw in an upright position for filing operations on the teeth thereof, a curved inclination rail pivotally carried by said support, said rail having bevel scales thereon extending right and left from a central point, and a bevel gauge comprising an upright plate with forwardly extending slotted arms thru which said rail extends, an index thereon for cooperating with the scales on the rail, and a clamping screw extending thru the upright plate for engaging the rail for holding the bevel gauge in adjusted position on the rail.

8. A device for filing circular saws including a base support for supporting and maintaining a circular saw in an upright position for filing operations on the teeth thereof, a curved inclination rail pivotally carried by said support, said rail having bevel scales thereon extending right and left from a central point, and a bevel gauge comprising an upright plate with forwardly extending slotted arms thru which said rail extends, an index thereon for cooperating with the scales on the rail, a clamping screw extending thru the upright plate for engaging the rail for holding the bevel gauge in adjusted position on the rail, said plate having a circular tapered opening therethru, a tapered hub rotatably mounted therein having a slot therethru for receiving and guiding a file holder, and means for holding said hub with the slot therein in angularly adjustable positions.

9. A device for filing circular saws including a base support for supporting and maintaining a circular saw in an upright position for filing operations on the teeth thereof, a curved inclination rail pivotally carried by said support, said rail having bevel scales thereon extending right and left from a central point, and a bevel gauge comprising an upright plate with forwardly extending slotted arms thru which said rail extends, an index thereon for cooperating with the scales on the rail, a clamping screw extending thru the upright plate for engaging the rail for holding the bevel gauge in adjusted position on the rail, said plate having a circular tapered opening therethru, a tapered hub rotatably mounted therein having a slot therethru for receiving and guiding a file holder, and means for holding said hub with the slot therein in angularly adjustable positions including, a plate from which said hub extends, said plate engaging the front face of said bevel gauge plate and having an index pointer on its upper end, a pitch angle gauge on said bevel gauge plate with which said pointer cooperates, said bevel gauge plate having an arcuate slot therethru, and a clamping screw extending from said pitch gauge plate and thru said arcuate slot in the bevel gauge plate for retaining the pitch gauge members assembled on the bevel gauge and clamping the same at adjusted pitch angles.

WALTER G. SHEARER.

REFERENCES CITED

The following references are of record in the file of this patent:

UNITED STATES PATENTS

| Number | Name | Date |
|---|---|---|
| 203,616 | Hays | May 14, 1878 |
| 409,866 | Penrose | Aug. 27, 1889 |
| 675,780 | Lucas | June 4, 1901 |
| 905,924 | Reynolds | Dec. 8, 1908 |
| 1,496,975 | Bothwell | June 10, 1924 |
| 1,852,276 | Waller | Apr. 5, 1932 |